United States Patent
Whynot et al.

(10) Patent No.: US 8,060,563 B2
(45) Date of Patent: Nov. 15, 2011

(54) COLLABORATION AGENT

(75) Inventors: Stephen Whynot, Mckinney, TX (US); John H. Yoakum, Cary, NC (US); Tony McCormack, Galway (IE)

(73) Assignee: Nortel Networks Limited, Mississauga, Ontario (CA)

( * ) Notice: Subject to any disclaimer, the term of this patent is extended or adjusted under 35 U.S.C. 154(b) by 13 days.

(21) Appl. No.: 12/344,914

(22) Filed: Dec. 29, 2008

(65) Prior Publication Data

US 2010/0169418 A1 Jul. 1, 2010

(51) Int. Cl.
G06F 15/16 (2006.01)
G06F 15/173 (2006.01)
G06F 15/177 (2006.01)

(52) U.S. Cl. ......... 709/204; 370/260; 370/315; 370/392

(58) Field of Classification Search .................. 709/203, 709/204, 217–228; 370/260, 315, 392
See application file for complete search history.

(56) References Cited

U.S. PATENT DOCUMENTS

| | | | |
|---|---|---|---|
| 7,343,008 B1 | 3/2008 | Frankel | |
| 2006/0288099 A1* | 12/2006 | Jefferson et al. | 709/224 |
| 2007/0165554 A1* | 7/2007 | Jefferson et al. | 370/315 |
| 2007/0165640 A1* | 7/2007 | Fitchett et al. | 370/392 |
| 2007/0165641 A1* | 7/2007 | Fitchett et al. | 370/392 |
| 2007/0167170 A1* | 7/2007 | Fitchett et al. | 455/456.1 |
| 2008/0037446 A1* | 2/2008 | Zhou et al. | 370/260 |
| 2008/0159179 A1* | 7/2008 | Shaffer et al. | 370/261 |
| 2008/0300852 A1* | 12/2008 | Johnson et al. | 704/2 |
| 2008/0310607 A1* | 12/2008 | Jachner | 379/93.21 |
| 2009/0005038 A1* | 1/2009 | Yasrebi et al. | 455/435.1 |
| 2009/0019367 A1* | 1/2009 | Cavagnari et al. | 715/716 |
| 2010/0020728 A1* | 1/2010 | Jefferson et al. | 370/260 |
| 2010/0153497 A1* | 6/2010 | Sylvain et al. | 709/204 |

FOREIGN PATENT DOCUMENTS

| | | |
|---|---|---|
| WO | 2007/000460 A1 | 1/2007 |
| WO | 2008/009090 A1 | 1/2008 |

OTHER PUBLICATIONS

International Search Report for PCT/IB2009/007862, mailed Jun. 3, 2010, pp. 1-10.

* cited by examiner

*Primary Examiner* — Haresh N Patel
(74) *Attorney, Agent, or Firm* — Withrow & Terranova, PLLC

(57) ABSTRACT

A collaboration agent for facilitating real-time communications on behalf of a user. The collaboration agent includes a conference bridge that anchors calls to the conference bridge. The collaboration agent uses contextual information associated with the user to manage the real-time communications. The collaboration agent can communicate with other collaboration agents associated with other users.

9 Claims, 8 Drawing Sheets

COLLABORATION AGENT

FIELD OF THE INVENTION

This invention relates generally to communications, and in particular to a collaboration agent for managing real-time communications on behalf of a user.

BACKGROUND OF THE INVENTION

Managing real-time communications, such as telephone calls, text messages, and instant messaging (IM) messages, can be time-consuming and frustrating at times. In a business environment, individuals frequently feel compelled to respond to real-time communications as quickly as possible, but may be unable to do so because the individuals are currently engaged in communicating with someone else. For example, an individual may be using a work phone to participate in a conference call when the individual is alerted that a call is coming in on a second line of the work phone. Other than observe the calling party's phone number, there is little the individual can do. The calling party may then attempt to call the individual's cell phone, and when that is similarly unsuccessful in reaching the individual, attempt to send the individual a text message or an instant message. The individual may be aware of each of these attempts by the calling party to reach the individual, but be unable to communicate with the calling party without disrupting the conference call. When the conference call is over, the individual may have to contact multiple voice messaging systems to determine whether or not the calling party left a message and the purpose of the call. The individual may only later learn that the calling party had an urgent need to contact the individual for a reason that, had the individual been aware of it, would have caused the individual to terminate participation in the conference call to accept the call from the calling party.

Business environments frequently have one or more sources of information that are useful in determining an individual's availability, presence, or location. For example, most business environments enable their employees to use an electronic calendar to schedule and keep track of meetings. For a particular meeting, the electronic calendar may include information such as a time and date of the meeting, the attendees of the meeting, and a physical location or dial-in information associated with the meeting. Business environments may also enable their employees to communicate with each other via instant messaging, which may include features such as presence indicators which can be used to indicate availability and willingness-to-communicate states of the respective employee. While aspects of these information sources may be visible to other users of the same application, they are not typically used in a real-time application that manages voice communications and other real-time communications. However, such information may be very valuable in establishing and facilitating communications between individuals. For example, in the example provided previously, had the calling party reached a service that could access the individual's electronic calendar, the calling party may have been able to determine another time they would be likely to reach the individual. Alternately, had the calling party reached a service that could indicate the individual was present in their office based on presence information associated with the individual, the calling party may have been able to simply walk to the individual's office. In general, it would be extremely helpful in today's business environment if an intelligent agent could help manage an individual's real-time communications based on information maintained about the individual in one or more information sources.

SUMMARY OF THE INVENTION

The present invention relates to a collaboration agent that manages real-time communications on behalf of a user. The collaboration agent includes a bridge, sometimes referred to as a conference bridge, and a contextual information interface adapted to obtain information about the user, such as availability, location, or presence. The collaboration agent anchors calls associated with the user to the conference bridge in a network rather than a user device. The user can interface with the collaboration agent via one or more end-user devices. The collaboration agent can interface with other collaboration agents to facilitate communications between associated users. For example, the collaboration agent can receive requests from other collaboration agents for available times during which the associated user is available for a conversation.

According to one embodiment of the invention, the collaboration agent includes a speech recognition processor for receiving commands from the user. The collaboration agent also includes an ability to communicate with the user, or other users, via text-to-speech processing, speech generation, or playing recorded messages. The collaboration agent establishes communications sessions between the conference bridge and a user device associated with the user, and other conference bridges associated with other users. The collaboration agent can mix multiple communications sessions associated with the conference bridge together, or can keep certain communications sessions separate from other communications sessions. The collaboration agent can deliver an audio signal to a user from multiple sources while preventing each source from hearing the audio associated with the other source.

According to one embodiment of the invention, the collaboration agent obtains meeting information from a calendar associated with the user via the contextual information interface. The collaboration agent can use the meeting information to remind the user of imminent or existing meetings of which the user is an attendee. The collaboration agent can also automatically connect the user to another conference bridge associated with another user based on the meeting information, and indicate to the user they have been joined to the other conference bridge, without direction from the user.

According to another embodiment of the invention, the collaboration agent can receive a request from a second user to establish a communications session between the conference bridge of the user and the conference bridge of the second user. The collaboration agent can determine from meeting information obtained via the contextual information interface that the user has a meeting scheduled at, or substantially near, the time of the request, and that the second user is an attendee of the meeting. The collaboration agent can automatically establish the communications session between the conference bridge of the first user and the conference bridge of the second user based on the meeting information and the identity of the second user.

According to yet another embodiment of the invention, the collaboration agent can receive a request to establish a first communications session between the conference bridge of the user and a second conference bridge of a second user for the purposes of enabling the second user to communicate with the first user. The collaboration agent determines that the first user is not present and is travelling on business. The collaboration agent successfully establishes a second communications session between the conference bridges of the users and indicates that the second user desires to speak with the user. Upon receiving an indication from the user, the collaboration agent enables communications between the first communications session and the second communications session, while maintaining the directory number of the user confidential.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention enables real-time and near real-time communications, such as telephone calls, instant messaging (IM) messages, and text messages (e.g., Short Message Service (SMS) messages), to be managed on a user's behalf by an intelligent controller, referred to herein as a collaboration agent, which preferably operates in conjunction with other collaboration agents to simplify, manage, and facilitate communications between respective users. While the invention described herein has primary applicability in a business environment and will be discussed in the context of a business environment, those skilled in the art will recognize applicability of the invention in other environments, and the invention is not limited to use in a business environment.

Figure 1:
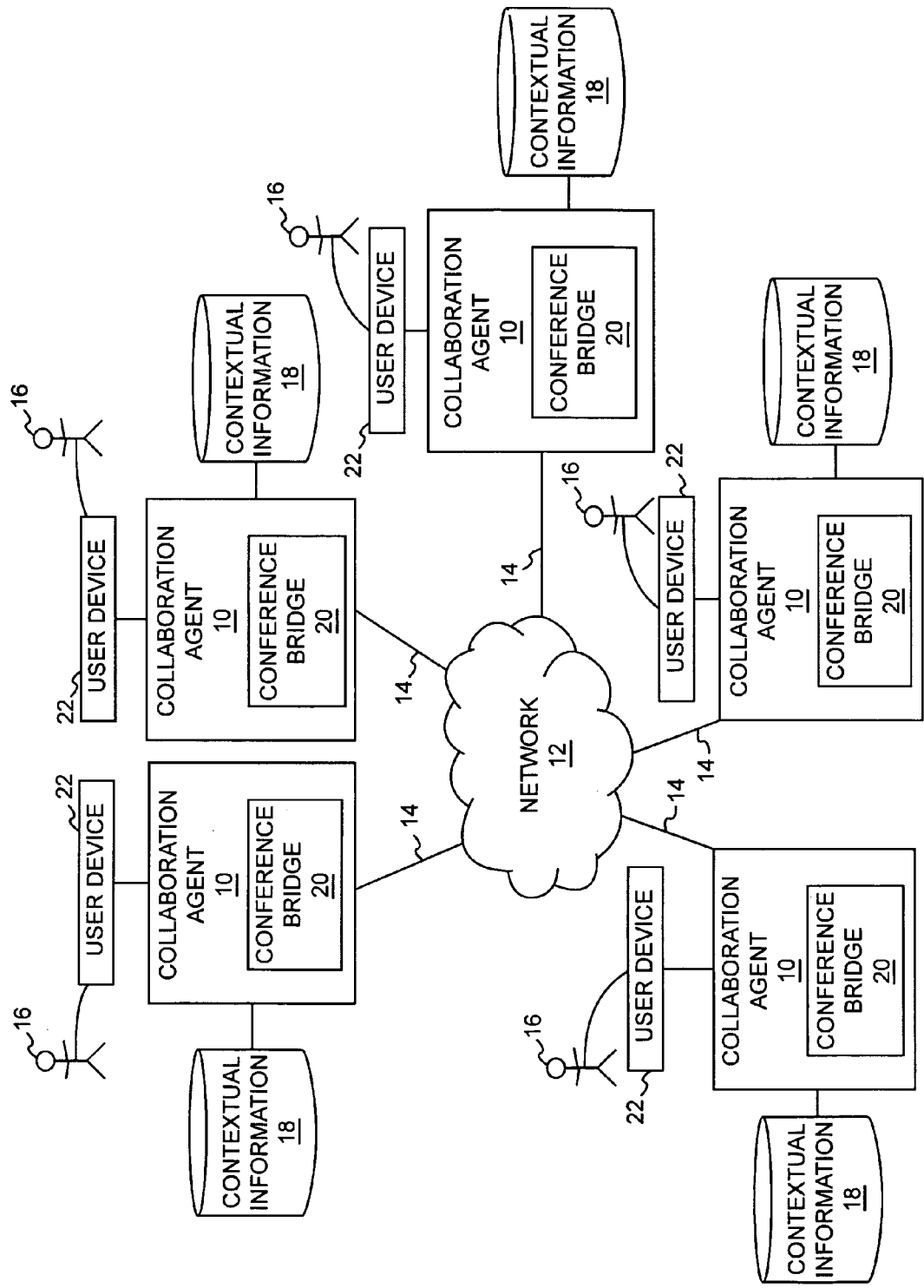
FIG. 1 is a block diagram illustrating a plurality of collaboration agents according to one embodiment of the invention.

FIG. 1 is a block diagram illustrating a plurality of collaboration agents according to one embodiment of the invention. A plurality of collaboration agents 10 are coupled to a network 12 via a communications link 14. The network 12 can comprise any combination of wired or wireless technologies, and can utilize any data transport technologies, such as Transmission Control Protocol/Internet Protocol (TCP/IP) or Sequence Packet Exchange/Internetwork Packet Exchange (SPX/IPX) that enable communications between the collaboration agents 10. The network 12 can, for example, comprise the Internet or can comprise a private enterprise network. The network 12 can also comprise a combination of networks, such as multiple private enterprise networks, that are coupled together to enable communications between multiple collaboration agents 10 associated with different enterprises. The communications links 14 can comprise any suitable access communications links, such as wired or wireless access links including Ethernet, broadband cable or Digital Subscriber Line (DSL) lines, WiFi, and the like. Each collaboration agent 10 has an associated user 16, and the collaboration agents 10 manage communications on behalf of the respective user 16. The collaboration agents 10 use associated contextual information 18 to make decisions on behalf of the respective user 16, or to locate the respective user 16, as described in greater detail herein. The collaboration agents 10 can communicate with one another via messaging and predefined requests using a standard or conventional messaging protocol. Notably, each collaboration agent 10 includes a conference bridge 20 for anchoring calls associated with the user 16. Each collaboration agent 10 can communicate with one or more user devices 22, such as wired, cordless or cellular telephones, Personal Digital Assistants (PDAs), computers, and the like, to provide communications with the user 16.

Figure 2:
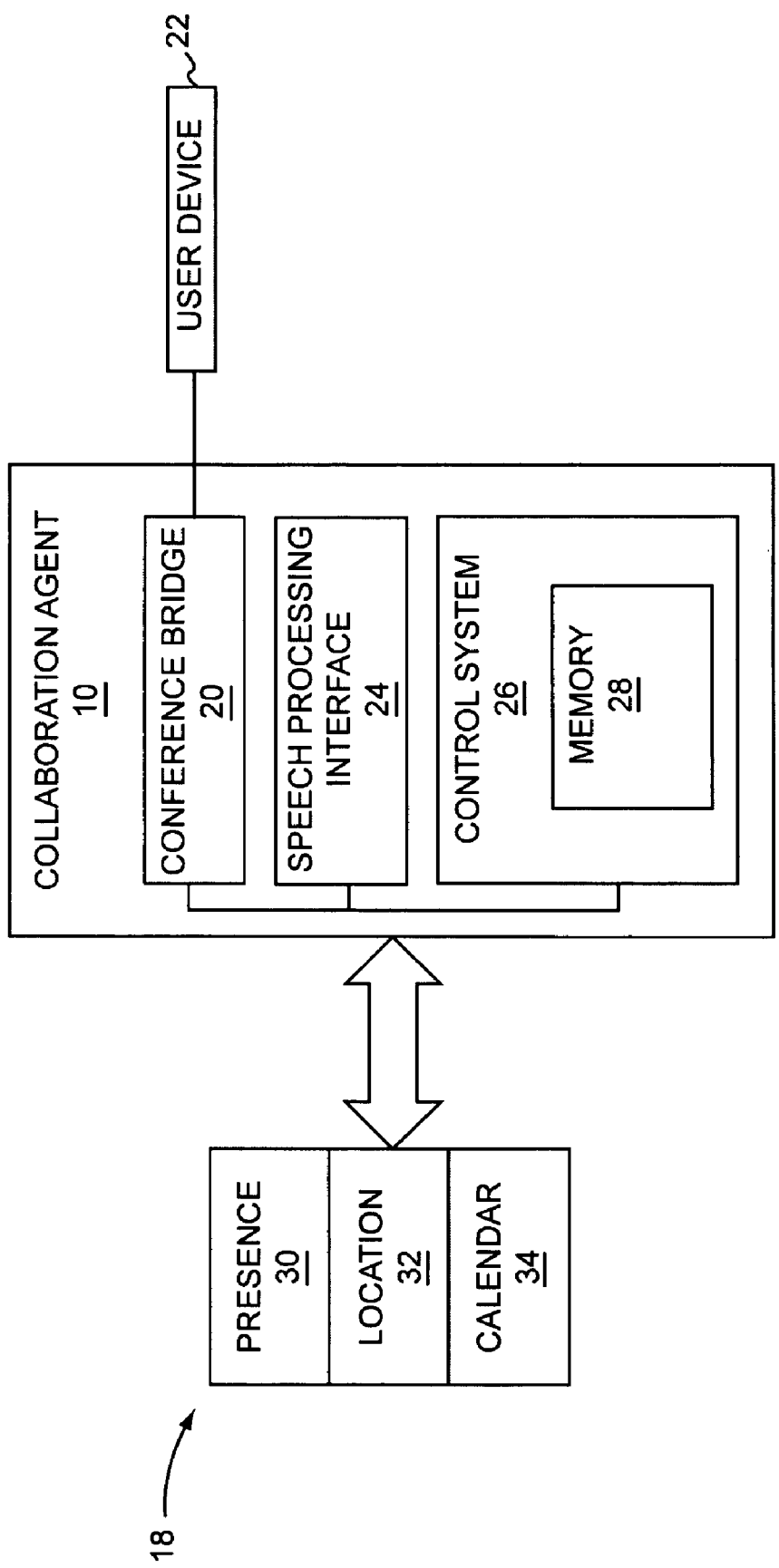
FIG. 2 is a block diagram illustrating a collaboration agent shown in FIG. 1 in greater detail.

FIG. 2 is a block diagram illustrating a collaboration agent shown in FIG. 1 in greater detail. The collaboration agent 10 preferably includes a speech processing interface 24 adapted to interface to speech processing technology that enables the collaboration agent 10 to receive instructions from a respective user 16. The speech processing technology can be integral with the collaboration agent 10, or can be a stand-alone speech recognition processor. If stand-alone, the speech recognition processor 24 can devote a speech recognition channel to each collaboration agent 10 upon initiation of the collaboration agent 10, or can provide a speech recognition channel on an on-demand basis. For one example of using speech recognition processing in an on-demand application, please see U.S. patent application Ser. No. 12/341,246, entitled METHOD AND SYSTEM FOR DETECTING A RELEVANT UTTERANCE, filed Dec. 22, 2008, which is hereby incorporated herein in its entirety. The speech processing interface, according to one embodiment of the invention, enables a user 16 to communicate with the collaboration agent 10 on a hands-free basis and in an intuitive and natural manner. The collaboration agent 10 also preferably has text-to-speech capabilities and the ability to play prerecorded messages or generated messages on behalf of the user 16 to another user 16, or to provide instructions or help to the respective user 16.

The collaboration agent 10 includes a control system 26 that includes a conventional or proprietary operating system capable of executing one or more programs loaded into a memory 28 that contain instructions suitable for carrying out the functionality described herein. According to one embodiment of the invention, the collaboration agent 10 comprises a media application server. The collaboration agent 10 interfaces to contextual information 18 that can include, for example, presence information 30, location information 32, or calendar information 34. The presence information 30 can comprise any suitable information that indicates a presence state of the user 16, or that implies a presence state of the user 16. For example, many IM applications enable a user to indicate a presence state such as "available," "busy," "out to lunch," and the like. The collaboration agent 10 can communicate with respective IM applications to obtain such presence information via any suitable protocols, such as Session Initiation Protocol (SIP), Extensible Messaging and Presence Protocol (XMPP), and the like. Alternately, the collaboration agent 10 may be able to infer a presence through other information. For example, when the user device 22 is off-hook, the collaboration agent 10 may infer a presence state of "busy" for the user 16.

The location information 32 can include any information that identifies, or implies, a location of the user 16. For example, the collaboration agent 10 may interface with a Global Positioning System (GPS) device associated with the user 16, or be able to determine a location through cellular telephone triangulation techniques known to those skilled in the art. Alternately, some enterprises provide employees Radio Frequency Identification (RFID) tags that monitor the physical location of an employee and provide that information to a central database, or monitor devices used by the user 16 in a similar manner. Alternately, the user 16 may set a location to indicate that they are "in the office," "at home," "in the car," and the like.

The calendar information 34 comprises information associated with a respective electronic calendar, or other activity tracking mechanism, of the user 16. Electronic calendars are widely used today to reserve meetings with other users' 16. Electronic calendars, such as Microsoft Outlook, enable users 16 with sufficient privileges to exchange meeting requests and reserve time slots on other users' 16 electronic calendars upon demand. Meeting requests typically include information such as the attendees of the meeting, location or dial-in information associated with the meeting, starting time and expected ending time of the meeting, and the like. Calendar information 34 can be obtained by the collaboration agent 10 using an appropriate application programming interface provided by the respective calendar provider, such as a Microsoft Outlook Application Programming Interface (MAPI), Google Calendar API, or a standard iCal calendar interface. While the presence information 30, the location information 32, and the calendar information 34 are shown separately in FIG. 2 for purposes of illustration, each of the presence information 30, the location information 32, and the calendar information 34 constitute contextual information 18, and similar contextual information 18 may come from one or more of the presence information 30, the location information 32, and the calendar information 34. For example, the collaboration agent 10 may infer presence and availability by examining whether the user 16 is involved in a meeting from obtaining the calendar information 34.

While calendar, presence, and location information are provided as examples of contextual information used in the present invention, those skilled in the art will appreciate that the invention is not limited thereto. Any type of contextual information that may be accessible to the collaboration agent 10 for determining availability of a respective user 16 may be used. For example, the collaboration agent 10 may use profile information associated with a cellular telephone of the user 16 that is accessible by the collaboration agent 10, or electronic records identifying the user 16 as being "on" or "off" duty, for example.

The collaboration agent 10 interfaces and controls the conference bridge 20 via one or more suitable protocols such as Call Control Extensible Markup Language (CCXML), Media Resource Control Protocol (MRCP), Media Server Control (mediactrl), and the like. The collaboration agent 10 uses the conference bridge 20 as an anchor point for communications sessions associated with the user 16. The conference bridge 20 includes a mixer, and enables certain communications sessions joined to the conference bridge 20 to be coupled with other communications sessions joined to the conference bridge 20 as desired. For example, a first communications session may exist between the user device 16 and the conference bridge 20, and a second communications session may exist between the conference bridge 20 and another conference bridge 20 associated with another user 16. The first and second communications sessions are joined together to enable the users 16 to converse with one another. The collaboration agent 10 may determine that a meeting obtained from the calendar information 34 begins in five minutes. The collaboration agent 10 can use the first communications session to inform the user 16 of the imminent meeting without enabling the audio signals to be provided to the second communications session so that the other user 16 is unaware that the first user 16 received an audible reminder of an imminent meeting.

Another example of the mixing features of the conference bridge 20 includes the ability for certain users 16 to hear the audio signals of some users 16 but not other users 16. For example, assume that a first user 16 has organized a first conference call with a first group of users 16 on the conference bridge 20 for 9:00 am-10:00 am, and a second conference call with a second group of users 16 on the conference bridge 20 for 10:00 am-11:00 am. At 9:55 am, before the first conference call has concluded, a third user 16 from the second group of users 16 is joined to the conference bridge 20 for the second conference call beginning at 10:00 am. However, because the third user 16 is not an attendee of the first conference call, the conference bridge 20 does not provide the audio signals from the communications sessions associated with the first group of users 16 to the third user 16 awaiting the second conference call. The conference bridge 20 may announce to the first user 16 associated with the conference bridge 20 that the third user 16 has joined the conference bridge 20 and awaits the 10:00 am call. The conference bridge 20 can enable the first user 16 to welcome the third user 16 and advise the third user 16 that the call will be beginning shortly, while simultaneously preventing the second group of users 16 from hearing the discussion between the first user 16 and the third user 16.

Anchoring calls to the conference bridge 20 provides several notable features, as will be discussed herein. For example, if the user 16 determines that they need to switch from a work phone to a cellular phone in the middle of a conversation, the individual or individuals with whom the user 16 is currently speaking via communications sessions joined to the conference bridge 20 need not redial or be inconvenienced. The user 16 only needs to establish a new communications session between the cell pone and the conference bridge 20. The new communications session can be initiated by the user 16 dialing a telephone number associated with the conference bridge 20, or the collaboration agent 10, or by asking the collaboration agent 10 to initiate a call to the cell phone associated with the user 16.

Figure 3:
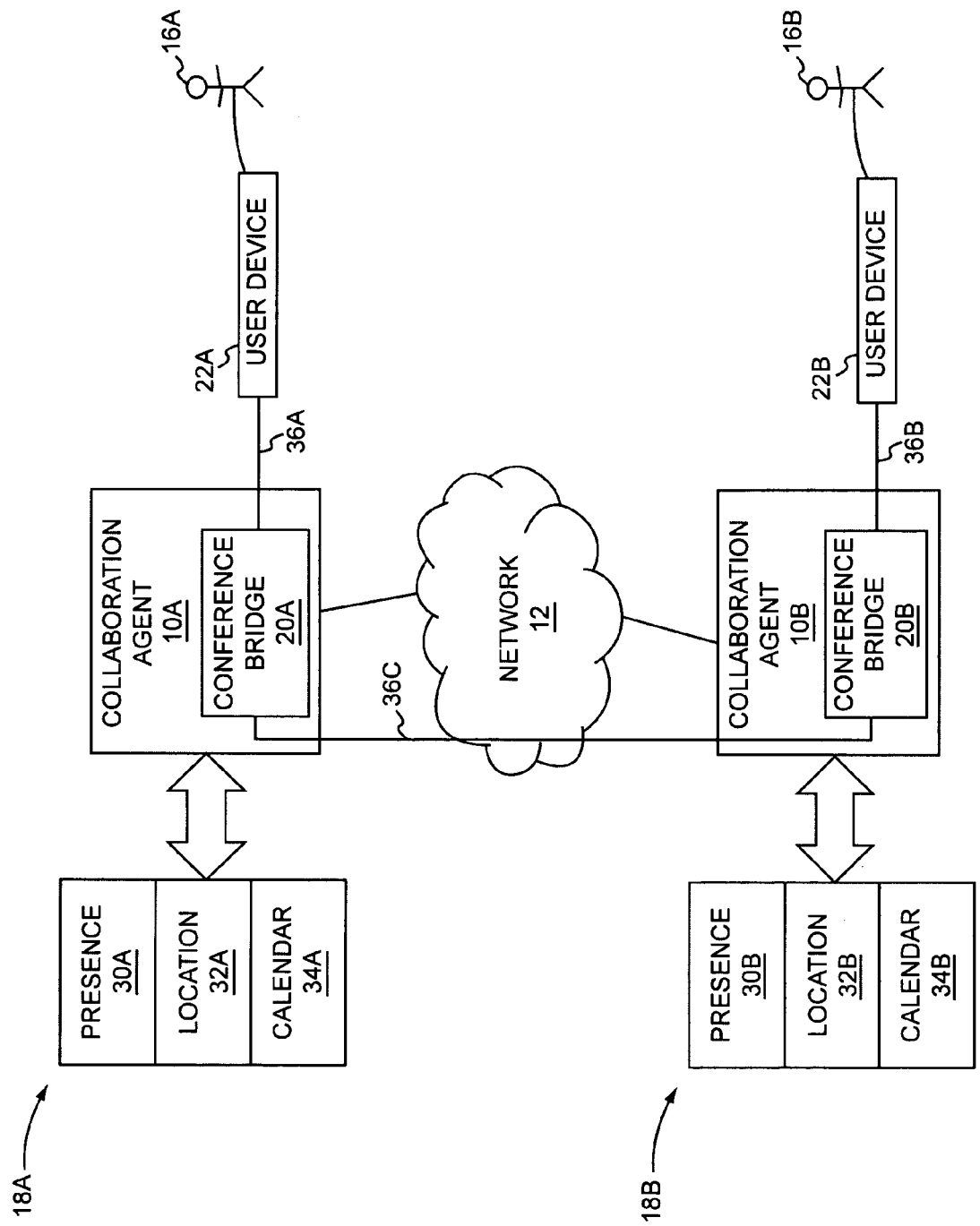
FIG. 3 is a block diagram illustrating two collaboration agents managing communications on behalf of respective users.

FIG. 3 is a block diagram illustrating two collaboration agents managing communications on behalf of respective users. FIG. 3 will be used herein to illustrate several ways in which the collaboration agents 10 can manage and facilitate real-time communications on behalf of a respective user 16. FIG. 3 will also be used in conjunction with FIGS. 4-7 to illustrate particular embodiments disclosed therein. While FIG. 3 illustrates a collaboration agent 10A and a collaboration agent 10B, the collaboration agents 10A, 10B may be referred to collectively as the collaboration agents 10 where the discussion does not relate to a particular collaboration agent 10A or collaboration agent 10B. Each collaboration agent 10 is preferably a routing point for all real-time communications destined for a respective user 16. This can be managed, for example, by forwarding telephone devices to a telephone number associated with the respective collaboration agent 10 and having IM messages forwarded from the respective IM applications to an address associated with the respective collaboration agent 10 via a network feature or other mechanisms known to those skilled in the art. Such configuration can be handled by a user 16 or by an administrator when setting up a collaboration agent 10 for use by a particular user 16.

The collaboration agent 10 receives textual communications, such as IM and text messages, and can provide them to the user 16 based on the contextual information 18 associated with the user 16. For example, assume that the user 16 is driving home from the office and the collaboration agent 10 receives an IM message for the user 16. The collaboration agent 10 can obtain contextual information 18 and determine that the user 16 is no longer in the office. The collaboration agent 10 can use the conference bridge 20 to attempt to contact the user 16 via the user's 16 cell phone. Assuming that the user 16 answers the cell phone, the collaboration agent 10 can provide a prerecorded message to the user 16 saying "An IM message has arrived." The collaboration agent 10 couples the communications session between the conference bridge 20 and the user device 22 to the speech processing interface 24. The user 16 may say "read the message." The speech processing interface 24 detects the command "read" and provides this information to the collaboration agent 10. The collaboration agent 10 uses text-to-speech processing to read the IM message to the user 16. The user 16 may reply "Send IM. Thanks for the message, I agree." The collaboration agent 10, via the speech processing interface 24, recognizes the command to create and send an IM message, and uses speech-to-text processing to convert the speech "Thanks for the message, I agree" to a textual format. The collaboration agent 10 then responds to the IM message with an IM message saying "Thanks for the message, I agree."

The collaboration agent 10A can communicate with the collaboration agent 10B on behalf of the user 16A as appropriate. For example, the collaboration agent 10B may initiate a request to open a voice communications session between the conference bridge 20A and the conference bridge 20B to enable the user 16B to converse with the user 16A. However, the collaboration agent 10A may determine that the user 16A is currently on the phone, and may determine from the calendar information 34A that the user 16A is engaged in a meeting until 3:00 PM, but is available at 3:00 PM for a conversation with the user 16B. The collaboration agent 10A can send a message to the user 16B that the user 16A is not available, but that the user 16A can speak with the user 16B at 3:00 PM. The collaboration agent 10B can determine if the user 16B is available at 3:00 PM and, if so, can confirm a meeting with the collaboration agent 10A, and each collaboration agent 10A and 10B can update the respective calendar to record the meeting at 3:00 PM. Each collaboration agent 10 may have rules, or filters, than can affect how the collaboration agent 10 manages or facilitates a real-time communication based on a particular criterion. For example, assume in the previous example the user 16B is the manager of the user 16A. The user 16A may set up a rule stating that any attempts from the user 16B to contact the user 16A are to be communicated to the user 16A if the user 16A is present at a user device 22. In this example, the collaboration agent 10A may then "whisper" or communicate to the user 16A via the conference bridge 20A that the user 16B is attempting to contact the user 16A. The whisper can not be heard by the other participants of the call in which the user 16A is currently engaged. The user 16A may determine that his presence is not needed on the call, terminate his participation in the call, and indicate to the collaboration agent 10A to establish the communications session between the conference bridge 20A and the conference bridge 20B to enable the user 16B to communicate with the user 16A.

The collaboration agent 10 is preferably always executing on behalf of the user 16. Thus, the collaboration agent 10, even during non-work hours, can make decisions on behalf of the user 16 to either arrange meetings in the future, or attempt to contact the user 16 based on criteria associated with a respective real-time communication.

Figure 4A:
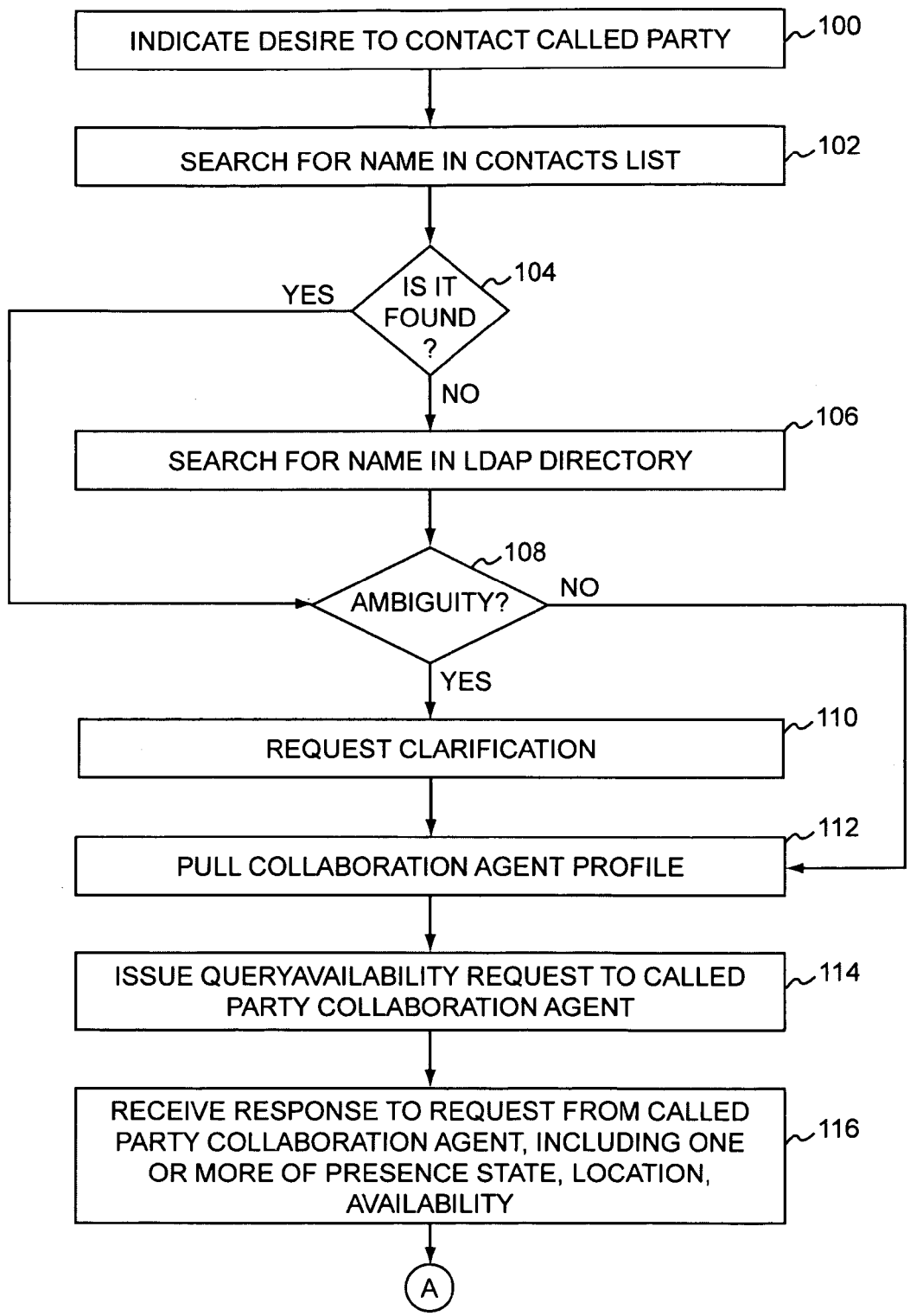
FIG. 4 is a flowchart illustrating a collaboration agent facilitating a real-time communication on behalf of a user according to one embodiment of the invention.
Figure 4B:
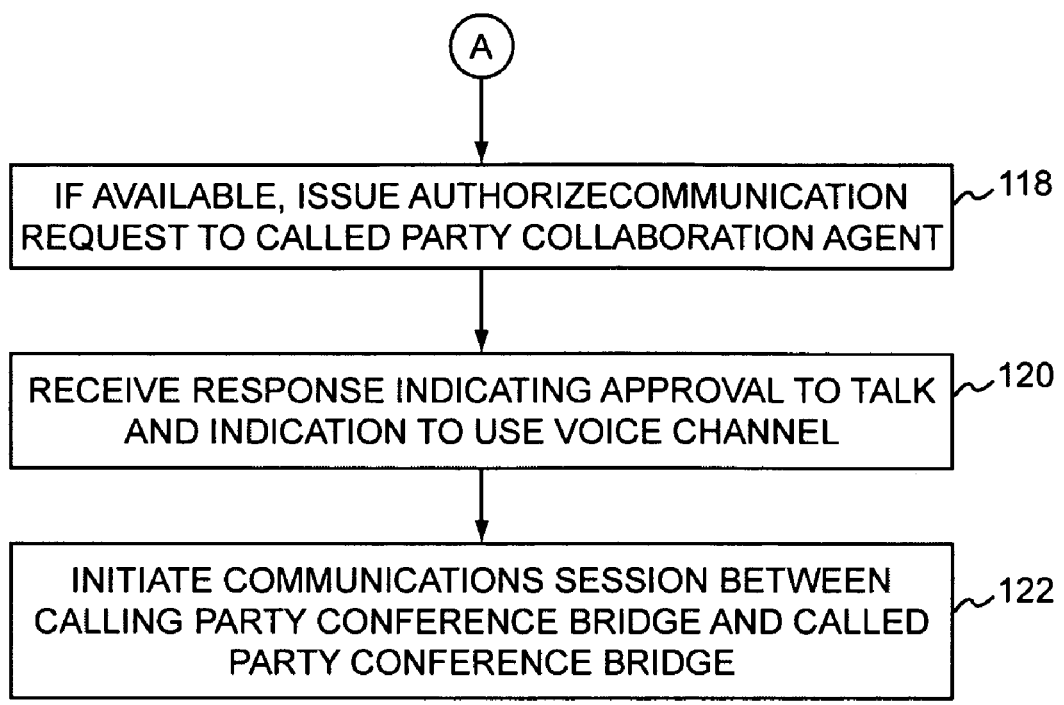

FIG. 4 is a flowchart illustrating a collaboration agent facilitating a real-time communication on behalf of a user according to one embodiment of the invention. FIG. 4 will be discussed in conjunction with FIG. 3. Assume that the user 16A wishes to communicate with the user 16B. The user 16A utters a command or a hot word into the user device 22A, which is coupled to the conference bridge 20A via a first communications session 36A. Preferably, according to one embodiment of the present invention, the user 16A remains coupled to the conference bridge 20A via the first communications session 36A during normal business hours so that the collaboration agent 10A can communicate to the user 16A via the user device 22A based on the receipt of real-time communications. For example, when the user 16A arrives at the office each morning, he uses a work telephone to dial into a telephone number associated with a respective collaboration agent 10A to establish a communications session between the work telephone and the collaboration agent 10A. The user 16A leaves the work telephone connected to the collaboration agent 10A throughout the day, and enables a speaker phone capability and hands-free speaking capability of the work telephone, so the user 16A can communicate with the collaboration agent 10A by merely speaking in proximity of the telephone, and similarly can hear information provided by the collaboration agent 10A when in proximity of the work telephone.

The collaboration agent 10A recognizes a command from the user 16A and prompts the user 16A for a particular command. The user 16A indicates a desire to contact the user 16B by identifying the user 16B by name (step 100). The collaboration agent 10A searches a contacts list associated with the user 16A for the name of the user 16B (step 102). If the collaboration agent 10A cannot locate the name of the user 16B in the contacts list (step 104), the collaboration agent 10A may refer to an enterprise-wide directory, such as a Lightweight Directory Access Protocol (LDAP) directory (step 106). Assume that the collaboration-agent 10A finds multiple names that are similar or identical to the name of the user 16B (step 108). The collaboration agent 10A can provide, via the first communications session 36A, a message to the user 16A requesting clarification, such as, for example, a last name associated with the user 16B, to remove the ambiguity (step 110). The user 16A can indicate the complete name of the user 16B, removing the ambiguity. The collaboration agent 10A can pull, or otherwise extract, a collaboration agent profile associated with the collaboration agent 10B from a database configured to store public profiles of users (step 112). The collaboration agent 10A can obtain an address of the collaboration agent 10B by, for example, by using the identity of the user 16B in a directory lookup as is known by those skilled in the art. The collaboration agent 10A issues a QueryAvailability request to the collaboration agent 10B (step 114).

The collaboration agent 10A receives a request from the collaboration agent 10B that includes one or more of presence information 30B, location information 32B, or calendar information 34B (step 116). If, from the provided information, the collaboration agent 10A determines that the user 16B is available for communication, the collaboration agent 10A can issue an AuthorizeCommunication request to the collaboration agent 10B (step 118). The collaboration agent 10B may review one or more rules associated with the user 16A and, for example, contact the user 16B to determine whether the user 16B desires to communicate with the user 16A. Assume that the collaboration agent 10B has determined that the user 16B desires to speak to the user 16A. Therefore, the collaboration agent 10B sends a response indicating an approval to talk with the user 16A indicating that a voice channel is a desired communications mechanism (step 120). The collaboration agents 10A, 10B then initiate a communications session 36C between the conference bridge 20A and the conference bridge 20B enabling the user 16A to communicate via the conference bridges 20A, 20B and communications sessions 36A, 36B, 36C (step 122).

Figure 5:
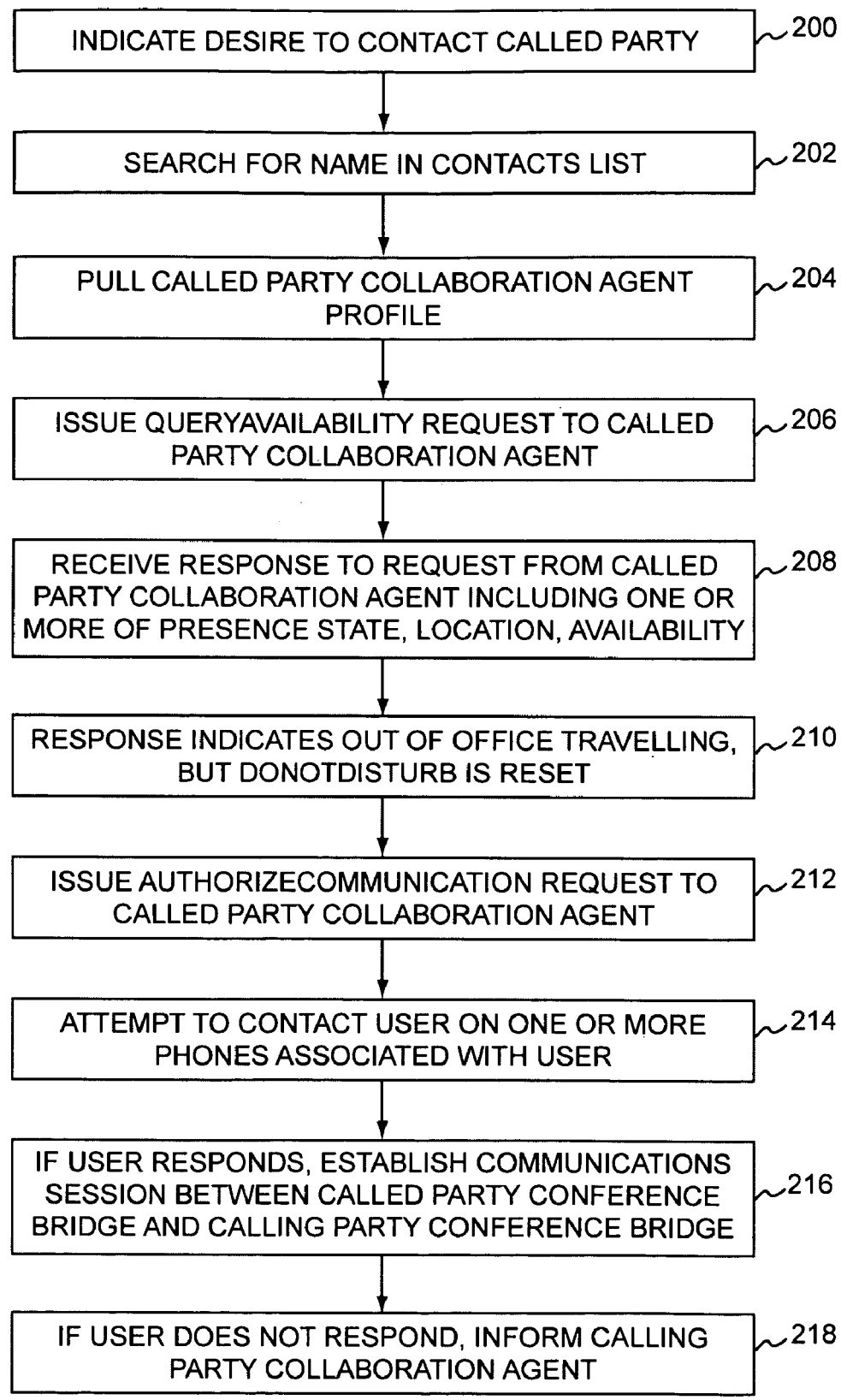
FIG. 5 is a flowchart illustrating a collaboration agent facilitating a real-time communication on behalf of a user according to another embodiment of the invention.

FIG. 5 is a flowchart illustrating a collaboration agent facilitating a real-time communication on behalf of a user according to another embodiment of the present invention. In this embodiment, assume the user 16A desires to communicate with the user 16B, but that the user 16B, unbeknownst to the user 16A, is traveling. Steps 200 through 208 may be identical to steps 100 through 116 discussed with reference to FIG. 4, and will not be repeated herein. However, in this embodiment the response from the collaboration agent 10B indicates that the user 16B is out of the office and traveling, but that a DoNotDisturb flag is reset, indicating that the user 16B may be contacted, if possible (step 210). The collaboration agent 10A issues an AuthorizeCommunication request to the collaboration agent 10B (step 212). The collaboration agent 10B, based on the contextual information 18B, determines that the user 16B is out of the office and traveling, and attempts to contact the user 16B via one or more user devices 22B associated with the user 16B (step 214). Notably, the collaboration agent 10B attempts to contact the user 16B without providing personal information, such as cell phone numbers associated with the user 16B, to the collaboration agent 10A.

Assume that the collaboration agent 10B is able to establish a communications session 36B between the conference bridge 20B and a user device 22B associated with the user 16B. The collaboration agent 10B informs the collaboration agent 10A to establish a communications session 36C between the conference bridge 20A and the conference bridge 20B, enabling the user 16A to converse with the user 16B (step 216). Alternately, if the user 16B could not be reached by the collaboration agent 10B, the collaboration agent 10B can inform the collaboration agent 10A that the user 16B is currently unavailable (step 218). At this point, the collaboration agents 10A, 10B could exchange one or more requests, such as FindFreeMeeting, ReserveMeeting, NotifyWhenAvailable, or LeaveVoiceMessage requests. The FindFreeMeeting and ReserveMeeting requests can be used by the collaboration agents 10A, 10B to obtain calendar information and negotiate a time for a meeting when both users 16A, 16B are available for a meeting, and to reserve the negotiated time on the respective calendars associated with the users 16A, 16B. The NotifyWhenAvailable request can be used to indicate to the collaboration agent 10B to notify the collaboration agent 10A when the contextual information 18B associated with the user 16B indicates that the user 16B is present and available. Upon notification, the collaboration agent 10A can inform the user 16A that the user 16B appears to be present and available, enabling the user 16A to again attempt to contact the user 16B. The LeaveVoiceMessage request can be used to enable the user 16A to leave a voice mail message for the user 16B.

Figure 6:
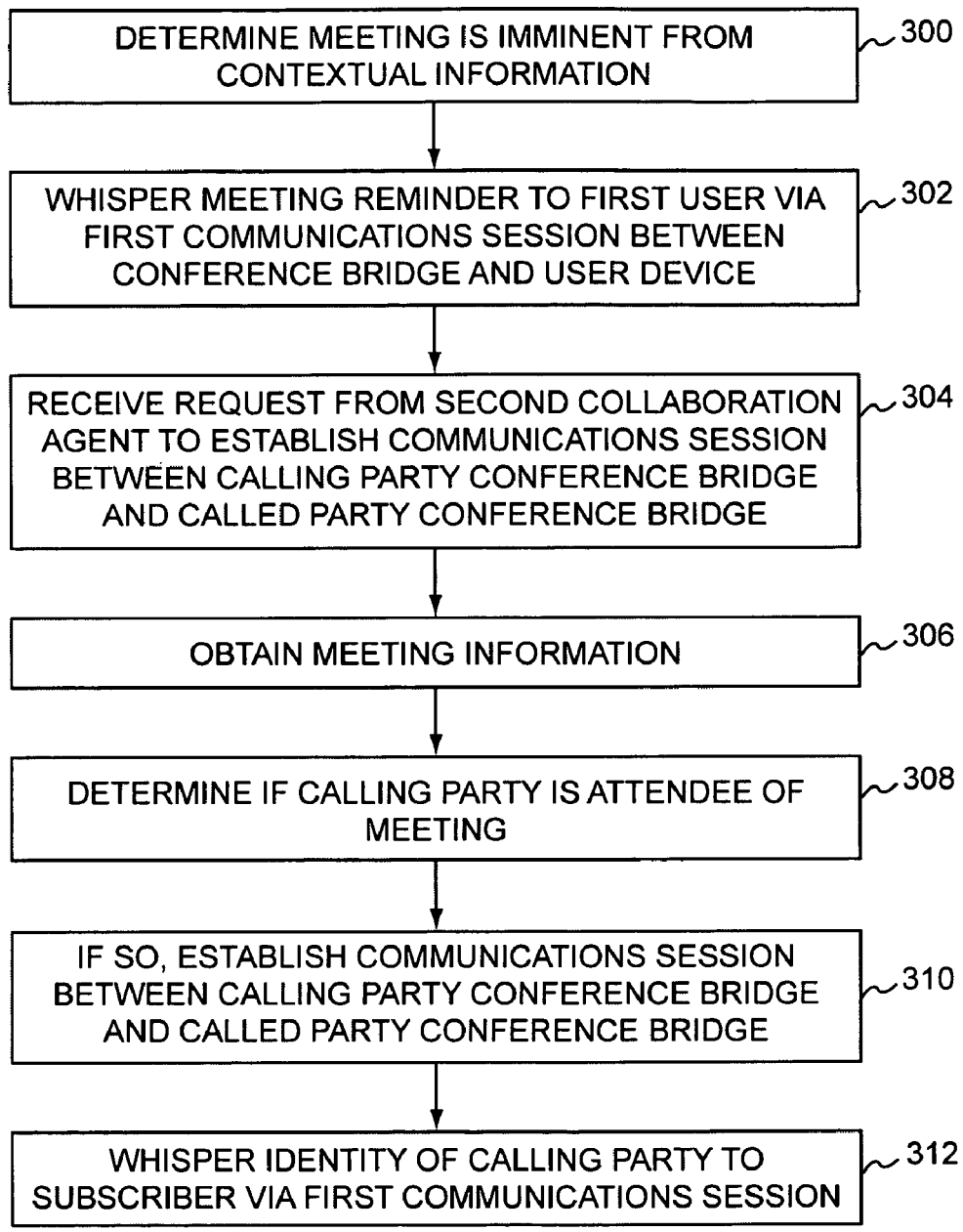
FIG. 6 is a flowchart illustrating a collaboration agent facilitating a real-time communication on behalf of a user according to yet another embodiment of the invention.

FIG. 6 is a flowchart illustrating a collaboration agent facilitating a real-time communication on behalf of a user according to yet another embodiment of the present invention. The collaboration agent 10A determines that the user 16A has an imminent meeting based on contextual information 18A obtained from the calendar information 34A (step 300). The collaboration agent 10A determines that the user 16A is in the midst of a communication with another user 16. The collaboration agent 10A whispers a meeting reminder via the first communications session 36A to the user 16A via the user device 22A that the user 16A has an imminent meeting (step 302). By "whisper," it is meant that the user 16A can hear the reminder from the collaboration agent 10A but no other participants in the call with the user 16A can hear the reminder.

The collaboration agent 10A then receives a request from the collaboration agent 10B to establish a communications session between the conference bridge 20A and the conference bridge 20B (step 304). The collaboration agent 10A obtains meeting information from the calendar information 34A (step 306). The collaboration agent 10A determines that the user 16B is an attendee of the meeting that is imminent (step 308). The collaboration agent 10A establishes a communications session between the conference bridge 20A and the conference bridge 20B enabling the user 16B to participate in the meeting at the time of the meeting (step 310). The collaboration agent 10A also whispers to the user 16A via the first communications session 36A that the user 16B has joined the conference bridge 20A (step 312).

Figure 7:
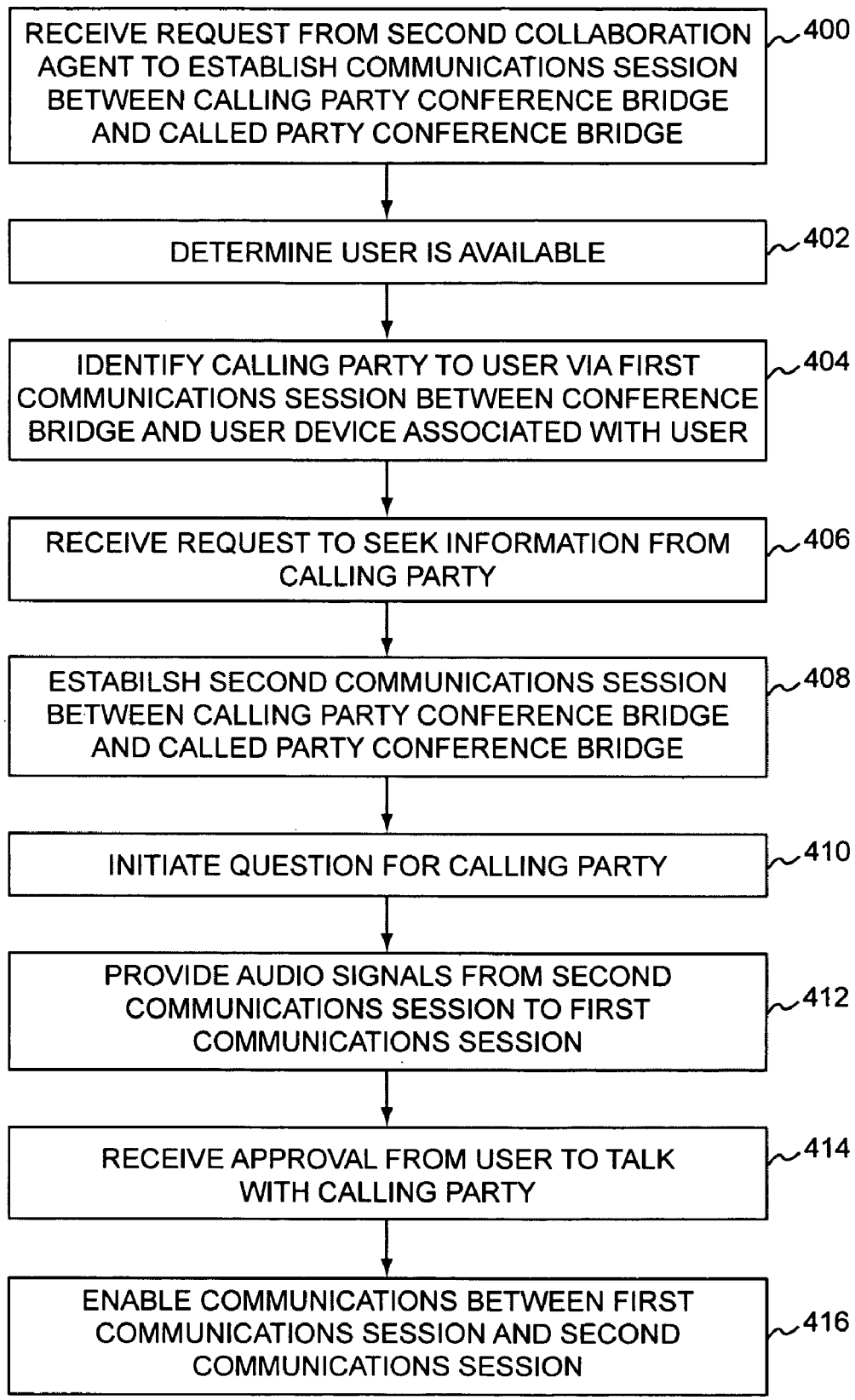
FIG. 7 is a flowchart illustrating a collaboration agent facilitating a real-time communication on behalf of a user according to yet another embodiment of the invention.

FIG. 7 is a flowchart illustrating a collaboration agent facilitating a real-time communication on behalf of a user according to yet another embodiment of the present invention. The collaboration agent 10A receives a request from the collaboration agent 10B to establish a communications session between the conference bridge 20A and the conference bridge 20B to enable the user 16B to converse with the user 16A (step 400). The collaboration agent 10A determines, based on contextual information 18A, that the user 16A is available for communication with the user 16B (step 402). However, the collaboration agent 10A determines that a rule exists that requires actual confirmation from the user 16A prior to establishing a communications session to enable conversations with the user 16B. Rules can be maintained in a storage device or memory accessible to the respective collaboration agent 10. Rules can be set up by a respective user 16 based on a variety of criteria such as calling party, time of day, and the like. The collaboration agent 10A identifies the user 16B to the user 16A via the communications session 36A (step 404).

The user 16A initiates a command to the collaboration agent 10A requesting additional information, such as the nature of the call, from the user 16B (step 406). The collaboration agent 10A establishes a communications session 36C between the conference bridge 20A and the conference bridge 20B (step 408) and provides the question from the user 16A to the user 16B via the communications session 36C (step 410). The user 16B responds with a reply to the request, and the collaboration agent 10A provides the audio signals from the user 16B to the first communications session 36A so that the user 16A can hear the response from the user 16B (step 412). The user 16A indicates approval to the collaboration agent 10A for a conversation with the user 16B (step 414). The collaboration agent 10A enables communications between the communications session 36A and the communications session 36C to enable the user 16A to converse with the user 16B (step 416).

According to another embodiment of the present invention, the collaboration agent 10A enables the user 16A to monitor a plurality of conference calls simultaneously. For purposes of illustration, assume that the user 16A is attending a first conference call via the conference bridge 20A. Assume that the first conference call is scheduled from 9:00 am to 11:00 am. Assume that the user 16A also has a second conference call that he is expected to attend that is scheduled from 10:00 am to 11:00 am. At 10:00 am, the collaboration agent 10A initiates a communications session with the conference bridge 20 that is hosting the second conference call. The collaboration agent 10A informs the user 16A that he has been joined to the second conference call, and mutes the outgoing audio associated with the first conference call so that attendees of the first conference call cannot hear the user 16A, and enables bidirectional audio on the second conference call so that the user 16A can indicate his presence to the attendees of the second conference call. The user 16A can then issue a command to the collaboration agent 10A to monitor the second conference call, and the collaboration agent 10A can enable bidirectional communications again for the first conference call, and inhibit outgoing audio for the second conference call so that attendees of the second conference call cannot hear the user 16A or the first conference call. The user 16A can now participate fully in the first conference call, while simultaneously monitoring the second conference call. Assume further that the user 16A determines that he must respond to a remark made on the second conference call. The user 16A issues a command to the collaboration agent 10A, and in response, the collaboration agent 10A inhibits the outgoing audio associated with the first conference call, and enables bi-directional audio with the second conference call. The user 16A speaks to the attendees of the second conference call, and the attendees of the first conference call cannot hear the user 16A, although the user 16A can continue to hear the audio associated with the first conference call simultaneously while the user 16A fully participates in the second conference call.

If desired, the collaboration agent 10A can issue a prerecorded message to either conference call as the user 16A moves from active to passive participation. For example, when the user 16A indicates he desires to speak to the attendees of the second conference call, the collaboration agent 10A may play a message to the attendees of the first conference call that indicates that the user 16A is departing the conference call temporarily. When the user 16A returns to full participation in the first conference call, the collaboration agent 10A can issue another prerecorded message to the attendees of the first conference call that the user 16A has returned to the conference call.

Those skilled in the art will recognize improvements and modifications to the preferred embodiments of the present invention. All such improvements and modifications are considered within the scope of the concepts disclosed herein and the claims that follow.

What is claimed is:

1. A method for communicating comprising:
receiving a request by a first collaboration agent, comprising a processor, associated with a first user from a second collaboration agent associated with a second user to establish a communications session between a first conference bridge associated with the first collaboration agent and a second conference bridge associated with the second collaboration agent;
receiving, by the first collaboration agent, information identifying the second user;
obtaining, by the first collaboration agent, contextual information associated with the first user at the time of the request, wherein the contextual information comprises calendar information identifying that the first user has no meeting at the time of the request;
establishing, by the first collaboration agent, a first communications session between the first conference bridge and the second conference bridge based on the contextual information; and
determining a rule associated with the second user, and wherein establishing the first communications session between the first conference bridge and the second conference bridge based on the contextual information comprises establishing the first communications session between the first conference bridge and the second conference bridge based on the contextual information and the rule.

2. The method of claim 1 wherein the contextual information comprises calendar information identifying a meeting and indicating that the second user is an attendee of the meeting.

3. The method of claim 1 further comprising establishing a second communications session between a user device associated with the first user and the first conference bridge, and notifying the first user that the first communications session has been established.

4. A method for establishing a communications session comprising:
establishing a first communications session between a first user device associated with a first user and a first conference bridge associated with the first user;
receiving a request by a first collaboration agent, comprising a processor, from a second collaboration agent to establish a second communications session between a second conference bridge associated with a second user and the first conference bridge;
receiving, by the first collaboration agent, information associated with the second user from the second collaboration agent;
announcing an identity associated with the second user to the first user via the first communications session;
receiving a response from the first user via the first communications session; and
establishing, by the first collaboration agent, the second communications session between the first conference bridge and the second conference bridge based on the response.

5. The method of claim 4 wherein receiving the response further comprises receiving an indication from the first user to establish the second communications session.

6. The method of claim 4 wherein the response from the first user is a request to seek information associated with the second user, and wherein establishing the second communications session between the first conference bridge and the second conference bridge based on the response further comprises establishing the second communications session between the first conference bridge and the second conference bridge, initiating a request for information from the second user via the second communications session based on the request, receiving information via the second communications session, providing the information to the first user, receiving an indication from the first user to establish communications between the first communications session and the second communications session, and establishing communications between the first communications session and the second communications session based on the indication.

7. The method of claim 6 wherein providing the information from the second user to the first user comprises providing audio signals received from the second communications session to the first user via the first communications session.

8. The method of claim 4 further comprising establishing a third communications session between a third conference bridge associated with a third user and the first conference bridge associated with the first user, wherein the first communications session and the third communications session are communicatively coupled via the first conference bridge to enable a conversation between the first user and the third user, and wherein announcing the identity associated with the second user to the first user via the first communications session further comprises announcing the identity associated with the second user to the first user via the first communications session without announcing the identity to the third user via the third communications session.

9. The method of claim 4 further comprising:
receiving a request by the first collaboration agent from a third collaboration agent to establish a third communications session between a third conference bridge associated with a third user and the first conference bridge;
establishing the third communications session between the first conference bridge and the third conference bridge; and
inhibiting audio signals associated with the first communications session and the second communications session from being provided to the third communications session.

* * * * *